Patented June 24, 1930

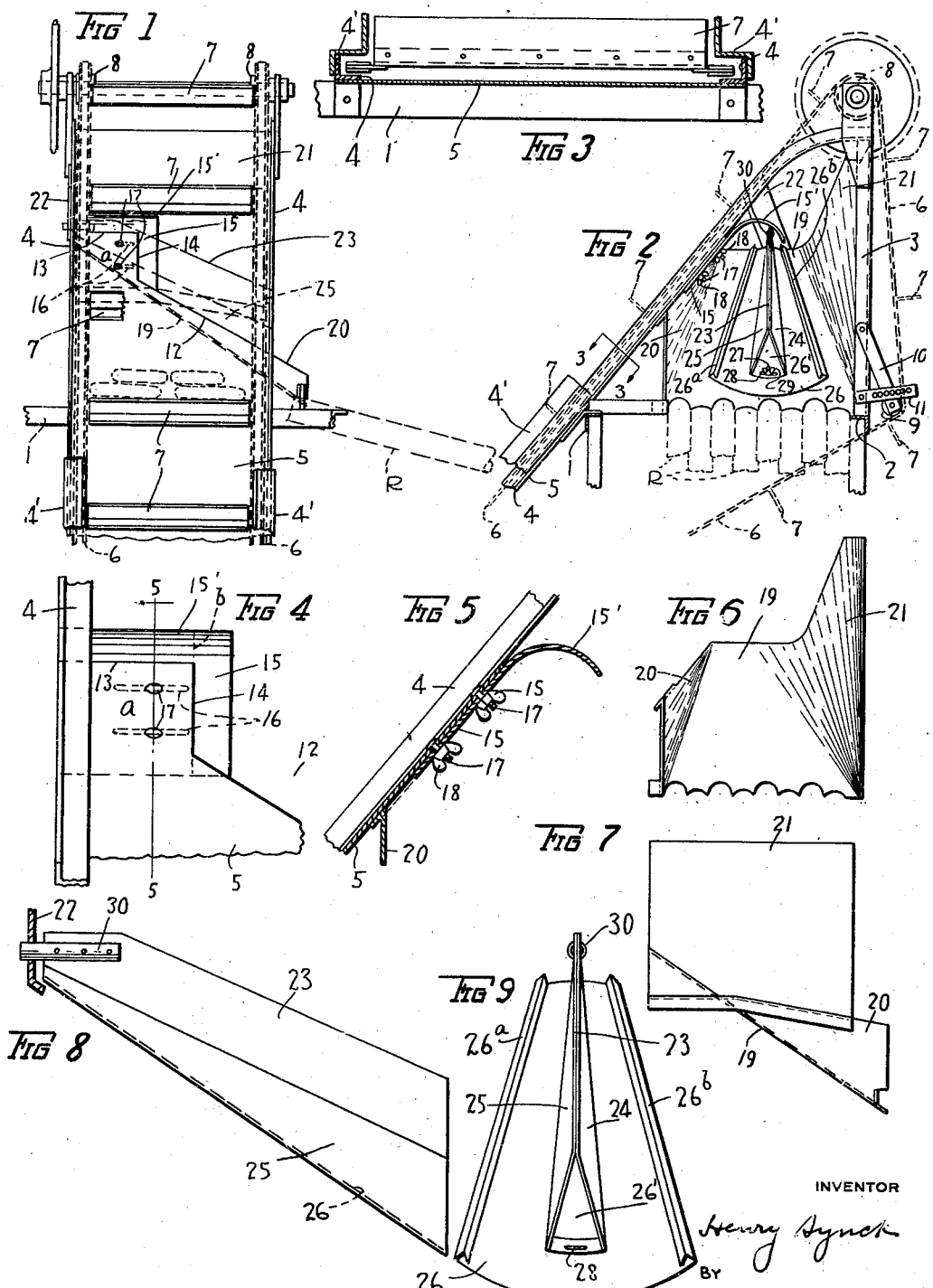

1,765,950

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

CORN PICKER AND HUSKER

Application filed June 24, 1929. Serial No. 373,083.

This invention relates to improvements in machines for picking and husking corn and especially to the means for delivering the ears of corn from the picking rolls to the husking rolls; it more particularly relating to an arrangement whereby the ears of corn are fed to the husking rolls in a more uniform manner.

In machines of this character it has been the practice to employ a husking unit approached by an inclined chute to the upper end of which the ears of corn are delivered by an endless conveyor arranged at right-angles to the direction of the length of the chute. In the present case the chute is divided longitudinally thus dividing the elevated ears of corn with one side leading to one half of the husking unit and the other side to the other half of the unit, the partition in the chute being not only to cause a feed to both halves of the husking unit but to drop the ears so as to cause them to feed end-on to the husking rolls. Provision must therefore be made to distribute the ears from the conveyor to both sides of the partition in substantially uniform quantities which contemplate two points of discharge one of which is higher than the other.

Difficulty has been experienced in securing a uniform discharge of the ears from the two channels mentioned, where such channels are of a fixed character, due to varying conditions in the corn. If the corn is comparatively green, the tendency is for the major portion of it to discharge through the low channel to the near side of the chute, while on the contrary if the corn is dry the tendency is for the major portion of the ears to hold to the conveyor and discharge from the high channel. This tendency is largely due to the fact that the dry ears are mixed with a larger proportion of blades and trash than the greener ones.

It is one of the objects of my invention to provide means to obviate this difficulty whereby the ears of corn may be delivered more uniformly to both sides of the chute regardless of the condition of the material; a more specific object in this connection being to provide an adjustable gate or valve whereby the capacities of the discharge channels may be varied to meet existing conditions.

A further object of my invention is to provide an improved form of chute for conveying the ears of corn to the husking unit whereby the ears may be fed end-on in a uniform manner.

Other objects will appear from the following description and claims.

In the accompanying drawings:

Fig. 1 is a front elevation of so much of a corn-picker and husker as is needed to show the improvements, the side walls of the conveyor being shown broken away.

Fig. 2 is a side elevation with the conveyor side walls broken away.

Fig. 3 is an enlarged section of the conveyor, the section being on the line 3—3 of Fig. 2.

Fig. 4 is an enlarged front elevation of the discharge end of the conveyor pan.

Fig. 5 is an enlarged section on the line 5—5 of Fig. 4.

Fig. 6 is an elevation looking into the chute from the end.

Fig. 7 is a side elevation of the chute.

Fig. 8 is an enlarged side elevation of the central partition for the chute.

Fig. 9 is an enlarged front elevation of the same partition.

Referring to the drawings 1 and 2 represent upper front and rear horizontal frame members of angle iron, the frame member 2 supporting a pair of vertical angle iron standards 3, one only of which is shown in the drawings.

The endless conveyor which conveys the ears of corn from the picking rolls to the chute leading to the husking roll consists of a pair of inclined angle irons 4 carrying side wall members 4' and to the under sides of which are connected a sheet metal pan 5 and over which passes a pair of sprocket chains 6 connected by slats 7. The sprocket chains pass about sprocket wheels 8 on the upper ends of the standards 3 and also idlers 9 carried by arms 10 pivoted to the standards 3; a pivoted brace 11 being provided for each arm whereby the tension of the chains may be adjusted. The angle iron members 4 are secured to the frame member 1 and have their upper ends curved and secured to the standards 3. The ears of corn are carried up the inclined pan by the slats and are discharged at the upper end thereof. Two points of discharge are provided, a lower point represented by the edge 12 which discharges into the near side of the chute to be hereinafter described and an upper point represented by the edge 13 which carries the corn to a point where it may be discharged into the remote side of the chute. The two points of discharge are separated by the edge 14 which extends from the inner end of the edge 12 to the inner end of the edge 13; the outline described forming in effect a reduced extension, indicated at $a$ at the upper end of the pan.

Adjustably secured to this extension $a$ is a valve or gate 15, the gate having slotted openings 16 to receive studs 17 projecting from the pan which have threaded thereon thumb nuts 18 by which the gate may be clamped in different positions of adjustment. This gate is substantially the same width as the width of the extension $a$ and its upper end is bent to a curved form as indicated at 15′ so as to overlie a portion of the chute to be described.

The chute is indicated at 19, this chute having sides 20 and 21 which diverge downwardly, the side 21 being extended upwardly a sufficient distance to prevent overthrow of the ears of corn discharged from the curved portion 15′ of the gate. This chute is connected to the frame members 2 and 3 and also to a strap 22 projecting from one of the angle iron members 4.

Located in the chute is a partition member 26 so formed from sheet metal as to provide three partitions which divide the chute into four channels. The main central partition is formed from sheet metal which is secured to the member 26 and is so shaped as to provide a vertical wall 23 and outwardly and downwardly inclined portions 24 and 25. This partition member has a bottom 26′ which rests upon and is secured to the member 26. The other auxiliary partition members, indicated at 26$^a$ and 26$^b$ are formed by bending the side edges of the member 26 into an inverted V-shape. The upper end of the chute is secured to a bifurcated rod 30 which extends from the strap 22. The main partition is of such a height as to confine the ears of corn to that side of the chute in which they will drop, while the auxiliary partitions are low enough to permit the ears of corn to drop into either one of the channels divided respectively thereby to prevent over-crowding of any channel and also serves to insure the ears of corn being fed uniformly end-on to the husking rolls.

In operation, the gate 15 is adjusted to meet the aforesaid conditions of the corn. If the corn is of comparatively green character, the tendency for the major portion of it is to feed over the edge 12 and consequently the gate is adjusted substantially to the position shown in full lines in Figs. 1 and 4 which has the result of retarding the tendency of ears to flow over the edge 12 so that substantially an equal amount of ears will pass up over the extension $a$ and curved portion of the gate 15′. If however the corn is in a dry state, the gate is adjusted to increase the size of the discharge edge 12 and decrease the discharge over the gate. The extreme position of this latter adjustment is indicated by the dotted line $b$ in Fig. 4 in which the inner edge of the gate will be substantially coincident with the inner edge of the extension $a$, and the outer edge of the gate will lie under the adjacent supporting member 4. It will be understood however that the gate may be adjusted to any intermediate position between the two extremes to suit conditions.

The corn flowing over the edge 12 drops into one or the other of the channels on one side of the central partition while the corn flowing over the rounded portion 15 of the gate drops into one or the other of the channels on the opposite side of the central partition. It will be seen that the channels formed by the walls of the chute and the partitions have the effect of keeping the ears of corn straightened out and causing them to approach the husking rolls end-on, these rolls being indicated in dotted lines at R in Fig. 2.

By this arrangement it will be seen that flow of the ears to either side of the central partition in the chute may be regulated so as to cause a uniform feed of ears to both sides of the husking unit and also that the ears will be kept straightened out in the chute so as to be properly fed to the rolls.

Having thus described my invention, I claim:

1. In a corn picker and husker machine, a divided chute, a conveyor located at right angles of and leading to said chute, said conveyor being arranged to discharge into both sides of said chute, and means for regulating the proportionate discharge.

2. In a corn picker and husker, a divided chute, a conveyor located at right angles of and leading to said chute, said conveyor being arranged to discharge into both sides of said chute, and an adjustable gate to regulate the proportionate discharge.

3. In a corn picker and husker, a divided chute, a conveyor leading to said chute including a pan, the discharge end of said pan being provided on one side with a discharge edge adapted to discharge in the near side of said chute and with an extension on its other side, said extension leading to the remote side of said chute, said member being adjustable transversely across said pan to regulate the width of said discharge edge.

4. In a corn husker and picker, an inclined chute leading to husking rolls, an inclined conveyor arranged at right-angles to said chute, said conveyor being arranged to discharge into both sides of said chute, and means for regulating the proportionate discharge.

5. In a corn husker and picker, an inclined chute leading to husking rolls, an inclined conveyor arranged at right-angles to said chute, said conveyor being arranged to discharge into both sides of said chute, and means for regulating the proportionate discharge, including an adjustable gate arranged to increase the width of one discharge point and decrease the width of the other discharge point.

6. In a corn husker and picker, a chute having side walls, a main central partition in said chute, auxiliary partitions between said side walls and main portion, said partitions being shaped so as to form with said side walls channels through which ears of corn slide end-on to the husking rolls.

7. In a corn husking and picking machine, an inclined chute divided to form a plurality of channels, an inclined conveyor having cross slats arranged to discharge in the upper end of said chute, husking rolls at the lower end of said chute, said channels extending in planes arranged at right-angles to said slats and extending in the general direction of the axis of rotation of said husking rolls.

8. In a machine of the character described, a conveyor for ears of corn, a plurality of pairs of husking rolls located in a plane below the discharge end of said conveyor and at one side thereof, an inclined chute extending from the discharge end of said conveyor to said husking rolls down which the ears of corn are adapted to slide end-on to said husking rolls, said chute extending in the general direction of the axis of rotation of said rolls whereby the ears of corn are fed end-on to said rolls, said chute having a plurality of channels, and means for so discharging the ears of corn from said conveyor that they are distributed into the respective channels of said chute.

In testimony whereof, I have hereunto set my hand this 23rd day of May, 1929.

HENRY SYNCK.